United States Patent

Lavoie

[11] 3,865,444
[45] Feb. 11, 1975

[54] SCREW CONVEYOR HANGER BEARING
[76] Inventor: Gilbert V. Lavoie, 311 Elm St., Raynham, Mass. 02767
[22] Filed: June 27, 1973
[21] Appl. No.: 373,976

[52] U.S. Cl. ............................................. 308/187.1
[51] Int. Cl. ................................................ F16c 1/24
[58] Field of Search ............ 308/187.1, 36.1, 27, 30

[56] References Cited
UNITED STATES PATENTS
| | | | |
|---|---|---|---|
| 2,094,251 | 9/1937 | Young | 308/187 |
| 2,237,004 | 4/1941 | King | 308/187 |
| 2,740,647 | 4/1956 | Van Pelt | 308/187 |
| 3,107,949 | 10/1963 | Moskovitz | 308/187.1 |

Primary Examiner—Robert S. Ward, Jr.
Assistant Examiner—Richard A. Bertsch
Attorney, Agent, or Firm—Barlow & Barlow

[57] ABSTRACT

An internal spiral conveyor hanger bearing which is arranged with a seal about the bearing means and a labyrinth path to prevent material being conveyed from coming into contact with the bearing itself and also to prevent the grease from exuding itself to contaminate the material being conveyed, which is achieved by a coupling shaft means having stepped sections, the bearing received about one of the sections and the hanger housing interfitting with the stepped sections and the tubular conveyor shaft in such a way as to provide the labyrinth path.

3 Claims, 4 Drawing Figures

PATENTED FEB 1 1 1975 3,865,444
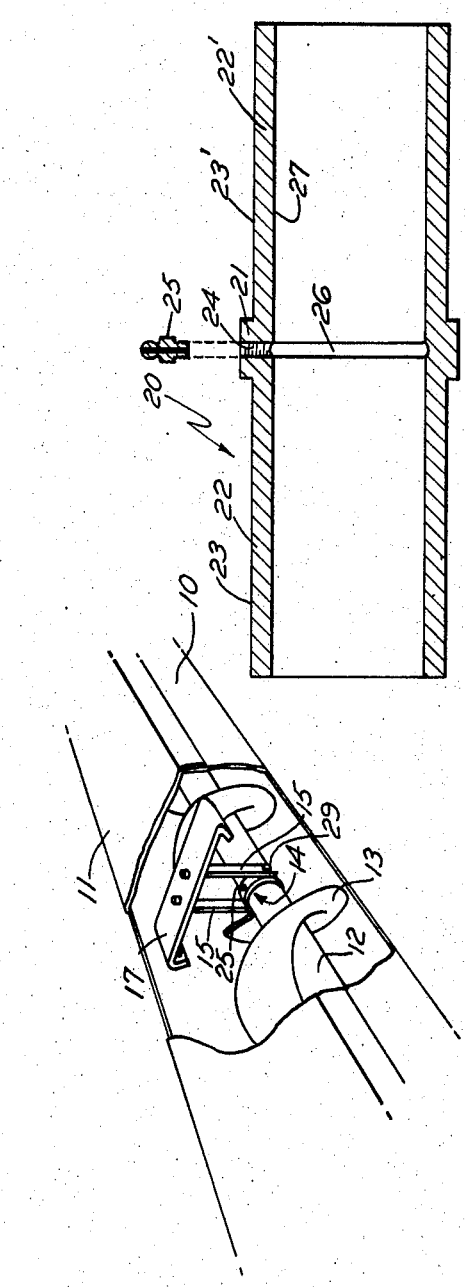
FIG. 1
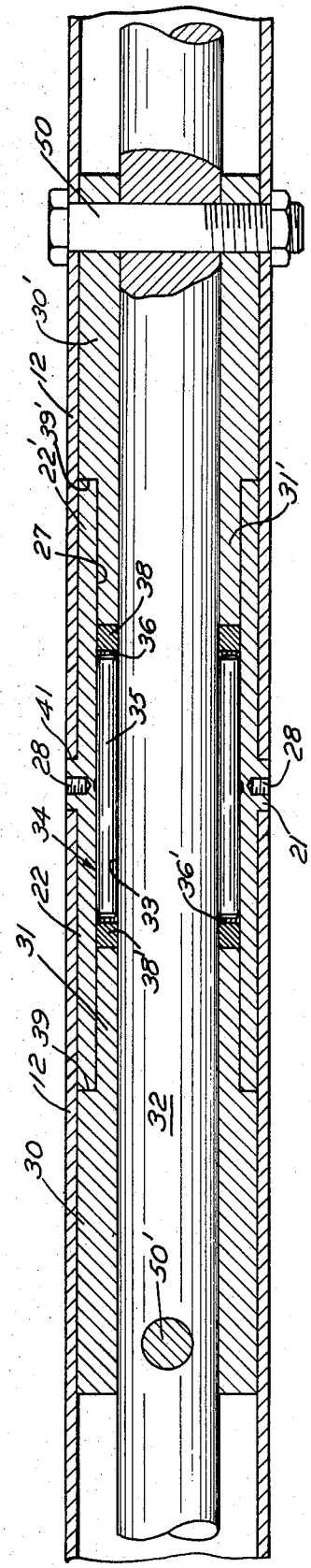
FIG. 2
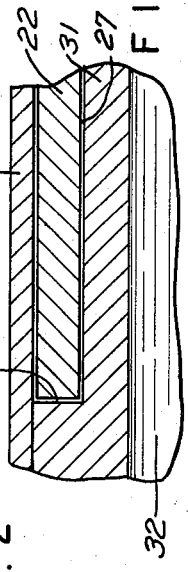
FIG. 3
FIG. 2A

SCREW CONVEYOR HANGER BEARING

BACKGROUND OF THE INVENTION

This invention relates to spiral conveyor hanger bearings which are used to support conveyor flights over long expanses where a number of intermediate bearings are necessary to prevent sagging of the conveyor flight and ultimate contact of the flights with the trough in which they are placed. In the past it has been customary to take a standard bearing such as a ball or roller bearing or Babbitt journal and provide a coupling shaft through the center of the bearing which would extend outwardly on either one or two sides of the bearing to which the tubular conveyor flight shaft could be conveniently attached. In all prior devices the abrasive and dusty materials would seep through the means provided to seal the bearing and damage the bearing, causing it to fail. Further, in any bearing constructions heretofore, it has been virtually imposible to maintain lubricant within the bearing since the same would exude through any sealing means and contaminate the material being conveyed. A partial solution to the problem has been suggested in U.S. Pat. No. 3,144,282 by pressurizing the bearing with air to keep the bearing itself clean, but this has not been entirely satisfactory since it cannot be used when hot materials are handled or when wet sticky materials are being used since there is no place for the air to escape.

SUMMARY OF THE INVENTION

This invention relates to a lubricated hanger bearing for a conveyor and particularly a construction of the bearing and the coupling shaft in such a way as to prevent lubricant within the bearing from coming out of the bearing and also for preventing abrasive materials from proceeding towards the bearing seal. Additionally the structure is such that the conveyor screw shaft extends onto the bearing housing for a considerable distance so as to keep the adjoining flights of the spiral conveyor relatively close together without excessive spacing therebetween. It is therefore the principal object of my invention to provide a hanger bearing which will not only effectually seal the bearing chamber against access thereto of abrasive materials but will likewise seal into the bearing chamber a substantial volume of lubricant, preferably in the form of light grease, which may be renewed from time to time through standard lubricant fittings. My invention further contemplates the provision on the bearing housing of a recess for receiving the tubular shaft of the conveyor flight so as to form a close running joint therewith which forms part of a labyrinth so that foreign matter has difficulty in working itself into this close joint and down into the bearing seal.

DESCRIPTION OF THE DRAWINGS

FIG. 1 is a perspective view of a hanger bearing in a conveyor trough made in accordance with the invention with the trough partly broken away;

FIG. 2 is a sectional view of the hanger bearing made in accordance with the invention;

FIG. 2A is an enlarged partial view of a section of FIG. 2 showing clearances; and FIG. 3 is a sectional view of the hanger bearing housing.

DESCRIPTION OF THE PREFERRED EMBODIMENT

Referring to FIG. 1 there is illustrated a conventional trough conveyor designated 10 which may have a cover 11. Located within this trough is a spiral conveyor which is made up of a tubular shaft 12 and flights 13. As seen in FIG. 1, the conveyor shaft 12 is interrupted as is the flight 13 and a hanger bearing is installed therebetween which hanger bearing is generally designated 14 and which is supported in position by a pair of brackets, for example, designated 15 that are suitably fastened to the hanger bearing housing 20 and are affixed to a horizontal bar 17 that extends between opposite sides of the trough 10. Other mounting means may of course be utilized to effect the same function, the mounting means not being part of the instant invention.

The hanger bearing 14 includes a cylindrical housing generally indicated 20, which is illustrated in FIG. 3, and consists essentially of a central portion or boss 21 with an extension or sleeve sections on either side thereof designated 22 and 22' which extensions have their outer annular portions indicated at 23, 23' of reduced diameter from the external diameter of central section 21. A uniform bore 27 extends through the housing and within the central portion 21 is located an inlet grease bore 24 into which a grease fitting as, for example, shown at 25 may be fitted and preferably a grease raceway 26 is provided about the central portion of the inner bore of this housing. Additionally the central portion 21 of the housing may be provided with a pair of tapped holes 28 (FIG. 2) circularly oriented from hole 24 and it is in these tapped holes 28 that the brackets 15 may be fastened with hex bolts 29 in a fashion known to those skilled in the art.

As illustrated in FIG. 2, the bearing assembly includes a coupling shaft means which is made up of a pair of outer sections 30, 30' each having a reduced or stepped end as indicated at 31, 31' and these outer sections receive within them a central shaft 32 so that the combination of these two sections and shaft produces a second or lesser diameter step section as indicated at 33. The sections 30, 30' and shaft 12 are pressed together into a force fit so that they are in effect an integral piece. About the portion 33 of central coupling shaft 32 is received a bearing means 34 herein shown as a roller bearing having a number of rollers 35 that are suitably caged with a cage 36, 36' at either end thereof in a manner well known to those skilled in the art. Adjacent each cage and indicated by cross hatching are sealing means 38, 38' which can take a variety of forms; that is to say, they may be felt pieces or lip seals or any other sealing means which will effectively extend between the outer diameter of the shaft 32 and the inner bore 27 of the hanger housing. Referring to FIG. 2A it will be seen that between the inner bore 27 of the hanger housing 20 and the outer diameter of the step portion 31, that a rotative fit is achieved by a diameter difference on the order of 5 to 10 thousandths of an inch. Similarly at the end of the extensions 22, 22' of the hanger housing, a space is left as at 39, 39' of approximately 0.005 inch to permit relative rotation between the hanger housing 20 and the coupling shaft means 30.

The conveyor screw shaft is a tubular shaft designated 12 and it fits about the outer surface 23, 23' of the hanger housing again with a diametrical difference on the order of 5 to 10 thousandths of an inch so that rotative motion can be had therebetween, and as can be readily seen in FIG. 2A, shaft 12 extends up to the central section 21 of the hanger housing, the flights 13 extending for this entire distance as seen better in FIG. 1, the flights having been omitted from the illustration of FIG. 2 for clarity.

In effect, the running joints between the conveyor screw shaft 12, first at the vertical joint 41 thence about the extension pieces 22, 22' of the hanger housing, the space at 39, 39' and the clearance between the inner bore of the hanger housing 27 and the outer diameter of the step portion 31 provide what I term a labyrinth packing that is effective to prevent access of foreign matter to the sealing means 38, 38' adjacent the cages of the bearing means. Grit or other foreign matter that tends to work its way inwardly through the vertical joint 41 between the shoulder 21 and the end of the conveyor screw shaft, will tend to make its escape therefrom responsive to centrifugal force at the radial joints 41, 39 and will not have any tendency to work its way through the labyrinth passage. If any foreign matter does work its way through the labyrinth passage, it will be caught by the packing 38 and kept out of the lubricant filled bearing.

In assembling the hanger bearing, an anti-friction bearing means such as the roller bearing 35 is first assembled onto the shaft portion 32 and then the packing means are placed on either side thereof. The hanger housing 20 is slid over the bearing 35 so that bore 27 forms an outer race and then in turn the tubular conveyor shaft 12 with the outer sleeves 30, 30' pressed into place are slid loosely into bore 27 at either end of the housing 20. The conveyor shaft 12 can be firmly bolted into place about coupling shaft 32 by the use of thru bolts such as 50, 50' and suitable means such as a lubrication fitting 25 may be put into place on the hanger housing to complete the unit whereupon the hanger bearing may be hung in a fashion such as shown in FIG. 1 or in any other suitable fashion.

I claim:

1. In an internally mounted screw conveyor shaft hanger bearing assembly, the combination with a tubular screw conveyor shaft of a coupling shaft means, said coupling shaft means having a stepped section of two diameters, an anti-friction bearing received about the lesser of the two diameters, a hanger housing extending about the bearing and forming an outer race therefor, said housing having an extension portion slidingly received on the greater of the diameter of said shaft coupling means, said housing extension having a reduced annular portion, the tubular conveyor screw shaft slidingly received about the reduced annular portion, means securing together said tubular shaft and said coupling shaft for rotation and means affixed to the central portion of the housing to support the housing in position, whereby a labyrinth is formed from the bearing to the outside of the conveyor shaft.

2. The combination as in claim 1 wherein said coupling shaft means comprises an inner cylindrical section and an outer section, the inner cylindrical section providing the lesser diameter, the outer section having a stepped end, and receiving thereabout the housing extension portion.

3. In combination, a tubular shaft, a connecting shaft received within and coupled for rotation to the tubular shaft, said connecting shaft having two reducing diameter stepped sections providing an inner and intermediate surface, an anti-friction bearing means, the inner surface of said connecting shaft forming an inner race, the intermediate surface having received thereabout an outer race sleeve, said sleeve having a boss extending therefrom and mounting means affixed to said boss, the end of said tubular shaft received about the sleeve and abutting said boss.

* * * * *